(Model.)

C. E. L. MOEBIUS.
REVERSIBLE MECHANISM FOR COUNTER SHAFTS.

No. 259,572. Patented June 13, 1882.

WITNESSES:
Chas. Nida
C. Sedgwick

INVENTOR:
C. E. L. Moebius
BY Munn & Co
ATTORNEYS.

UNITED STATES PATENT OFFICE.

CHRISTIAN E. L. MOEBIUS, OF NEW YORK, N. Y.

REVERSIBLE MECHANISM FOR COUNTER-SHAFTS.

SPECIFICATION forming part of Letters Patent No. 259,572, dated June 13, 1882.

Application filed May 2, 1882. (Model.)

*To all whom it may concern:*

Be it known that I, CHRISTIAN E. L. MOEBIUS, of the city, county, and State of New York, have invented certain new and useful Improvements in Reversible Mechanisms for Counter-Shafts, of which the following is a full, clear, and exact description.

Reference is to be had to the accompanying drawings, forming a part of this specification, in which similar letters of reference indicate corresponding parts in all the figures.

Figure 1:
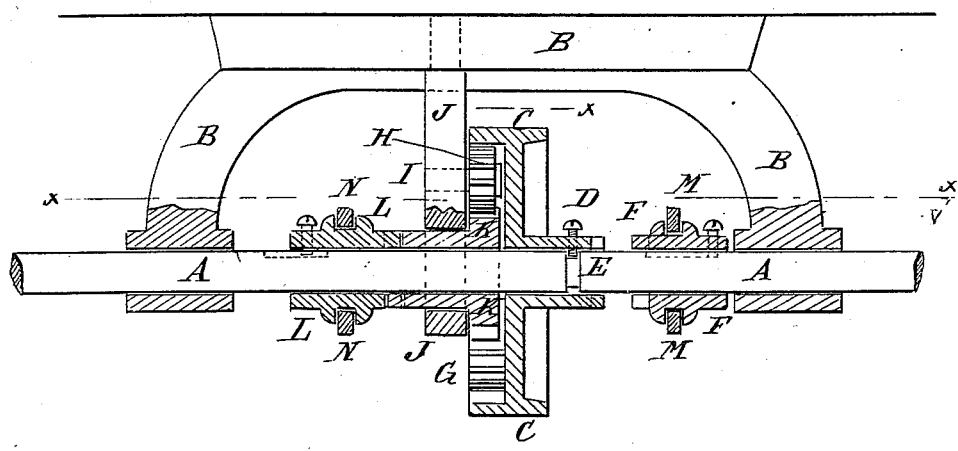
Figure 2:
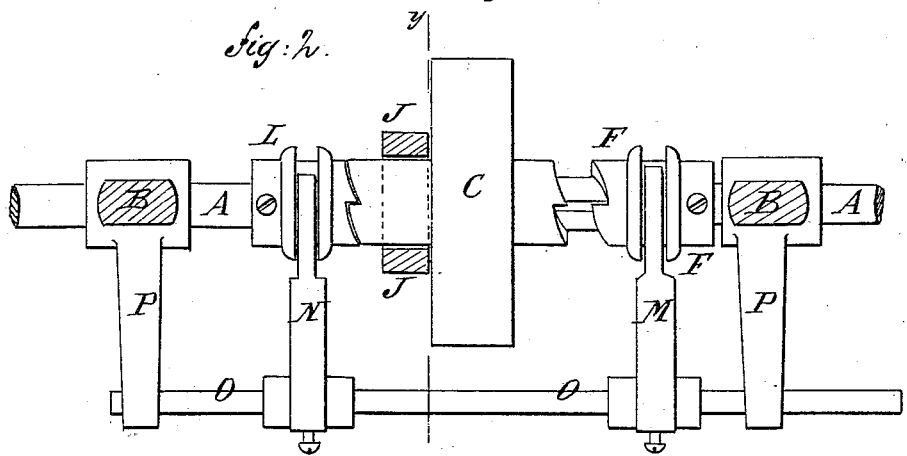
Figure 3:
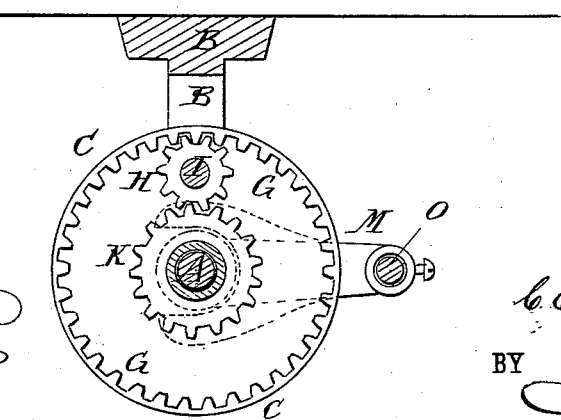

Figure 1 is a sectional front elevation of my improvement. Fig. 2 is a sectional plan view of the same, taken through the line $x\ x\ x$, Fig. 1. Fig. 3 is a sectional side elevation of the same, taken through the line $y\ y$, Fig. 2.

The object of this invention is to facilitate the changing of the direction of motion of a shaft while the driving belt and pulley continue to move in the same direction.

A is a counter-shaft which revolves in bearings in a hanger, B, attached to some suitable support in the ordinary manner.

C is the driving-pulley, which runs loose upon the shaft A, and is kept from longitudinal movement upon the said shaft by a set-screw, D, which passes through the hub of the said pulley and enters an annular groove, E, in the said shaft. The pulley C is made to carry the shaft A with it in its revolution by the clutch F, which slides upon the said shaft and engages with clutch-teeth formed upon the said pulley.

Upon the inner surface of the rim of the pulley C, upon the side opposite the clutch F, is formed, or to it is attached, a gear-wheel, G, into the teeth of which mesh the teeth of a small intermediate gear-wheel, H, which revolves upon a gudgeon, I, attached to a stud, J.

The upper end of the stud J is attached to the hanger B, and in its lower end is formed a bearing in which revolves the hub of a gear-wheel, K. The teeth of the gear-wheel K mesh into the teeth of the intermediate gear-wheel, H, and its hub runs loose upon the shaft A. The gear-wheel K is kept from longitudinal movement upon the shaft A in one direction by the pulley C, and in the other direction by the stud J.

L is a clutch which slides upon the shaft A and engages with clutch-teeth formed upon the end of the hub of the gear-wheel K. With this construction when the clutch F is thrown out of gear with the pulley C and the clutch L is thrown into gear with the gear-wheel K the revolution of the pulley C in one direction will revolve the shaft A in the other or reverse direction.

In annular grooves in the clutches F L ride the forked ends of two arms, M N, the other ends of which are secured to a rod, O, which slides in bearings in arms P, formed upon or attached to the hanger B. The rod O can be operated by hand or by means of a lever connected with and pivoted to some suitable support. By this construction both the clutches F L will be operated at the same time and by one movement to throw one of the said clutches out of and the other into gear with the pulley C, according as it is desired to have the shaft A revolved in a forward or in a reversed direction or to throw both clutches out of gear when it is desired to have the said pulley run free.

Having thus fully described my invention, I claim as new and desire to secure by Letters Patent—

The combination, with a counter-shaft journaled in a hanger, B, carrying a loose pulley, C, having clutch-teeth and provided with a sliding clutch, F, of the gear-wheels G H K, the gudgeon I, and the hanger-stud J, having a bearing at its lower end for the wheel K, as and for the purpose specified.

C. E. L. MOEBIUS.

Witnesses:
 JAMES T. GRAHAM,
 C. SEDGWICK.